(12) United States Patent
Minkin

(10) Patent No.: US 8,817,035 B2
(45) Date of Patent: Aug. 26, 2014

(54) TEXTURE PIPELINE CONTEXT SWITCH

(71) Applicant: NVIDIA Corporation, Santa Clara, CA (US)

(72) Inventor: Alexander L. Minkin, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/776,627

(22) Filed: Feb. 25, 2013

(65) Prior Publication Data

US 2013/0169651 A1 Jul. 4, 2013

Related U.S. Application Data

(63) Continuation of application No. 11/316,117, filed on Dec. 21, 2005, now abandoned.

(51) Int. Cl.
*G06T 11/40* (2006.01)

(52) U.S. Cl.
USPC ............................. 345/552; 345/522; 345/582

(58) Field of Classification Search
CPC ............ G06T 1/60; G06T 1/20; G06T 15/005
See application file for complete search history.

(56) References Cited

U.S. PATENT DOCUMENTS

| | | | | |
|---|---|---|---|---|
| 5,224,210 A * | 6/1993 | Pinedo et al. | ................. | 345/501 |
| 5,430,841 A * | 7/1995 | Tannenbaum et al. | ........ | 345/502 |
| 5,794,037 A * | 8/1998 | Young | ........................... | 718/108 |
| 5,886,705 A * | 3/1999 | Lentz | ............................. | 345/582 |
| 6,111,584 A * | 8/2000 | Murphy | ........................ | 345/582 |
| 6,208,361 B1 * | 3/2001 | Gossett | ....................... | 345/536 |
| 6,229,553 B1 * | 5/2001 | Duluk et al. | .................. | 345/506 |
| 6,246,422 B1 * | 6/2001 | Emberling et al. | ........... | 345/552 |
| 6,297,832 B1 * | 10/2001 | Mizuyabu et al. | ............ | 345/540 |
| 6,356,995 B2 * | 3/2002 | Chen | ............................. | 712/209 |
| 6,380,942 B1 * | 4/2002 | Hussain et al. | ............... | 345/522 |
| 6,437,788 B1 * | 8/2002 | Milot et al. | ................... | 345/552 |
| 6,559,854 B2 * | 5/2003 | Oka et al. | ...................... | 345/582 |
| 6,674,841 B1 * | 1/2004 | Johns et al. | .................. | 379/67.1 |
| 6,782,432 B1 * | 8/2004 | Nelson et al. | ..................... | 710/1 |
| 6,831,653 B2 * | 12/2004 | Kehlet et al. | .................. | 345/558 |
| 6,885,374 B2 * | 4/2005 | Doyle et al. | .................. | 345/505 |
| 7,061,500 B1 * | 6/2006 | Baldwin | ....................... | 345/582 |
| 7,385,608 B1 * | 6/2008 | Baldwin | ....................... | 345/506 |
| 2003/0164830 A1 * | 9/2003 | Kent | .............................. | 345/505 |
| 2004/0189650 A1 * | 9/2004 | Deering | ........................ | 345/506 |
| 2006/0022990 A1 * | 2/2006 | Mech | ........................... | 345/582 |
| 2007/0103476 A1 * | 5/2007 | Huang et al. | .................. | 345/522 |
| 2008/0094409 A1 * | 4/2008 | Koguchi et al. | ............... | 345/582 |

\* cited by examiner

*Primary Examiner* — David Zarka
*Assistant Examiner* — David H Chu
(74) *Attorney, Agent, or Firm* — Kilpatrick Townsend & Stockton LLP

(57) ABSTRACT

Circuits, methods, and apparatus that perform a context switch quickly while not wasting a significant amount of in-progress work. A texture pipeline includes a cutoff point or stage. After receipt of a context switch instruction, texture requests and state updates above the cutoff point are stored in a memory, while those below the cutoff point are processed before the context switch is completed. After this processing is complete, global states in the texture pipeline are stored in the memory. A previous context may then be restored by reading its texture requests and global states from the memory and loading them into the texture pipeline. The location of the cutoff point can be a point in the pipeline where a texture request can no longer result in a page fault in the memory.

20 Claims, 12 Drawing Sheets

TEXTURE PIPELINE CONTEXT SWITCH

CROSS-REFERENCES TO RELATED APPLICATIONS

This application is a continuation of U.S. patent application Ser. No. 11/316,117, filed Dec. 21, 2005, which is incorporated by reference.

BACKGROUND

The present invention relates generally to graphics processors and more particularly to fast context switching that reduces the loss of in-progress processing work.

Computer applications or programs running on a computing platform typically generate images for display on a monitor. The images may be a program output, for example a scene from a video game, they may provide an input to a program, or they may be some combination of these, such as a document created using a word processing application.

These images appear in a window on the monitor. The window may be larger, smaller, or the same size as the display monitor. Commonly, users have several windows open simultaneously, some or all of which may be at least partially visible at any given time. Each of these windows may also be referred to as a context.

Each application or program can include drivers, modules, and other software routines. Also, they may utilize other software that may be available on the computing platform. A graphics processor uses these tools to generate individual pixels of an image that appears on the monitor. When multiple windows or contexts are open, the graphics processor may work on generating pixels for a first window or context, then it may switch to generating pixels for a second window or context. This is referred to as a context switch.

It is desirable to be able to switch from one context to another quickly. When a graphics processing circuit is instructed or otherwise determines that a context switch should occur, delay in performing the switch reduces graphics system performance. In particular, 3-D images may be degraded. However, switching from one context to another too quickly can waste processing power by deleting or otherwise not using processing work that is in progress.

Thus, it is desirable to be able to perform a context switch quickly while not wasting a significant amount of in-progress work.

SUMMARY

Accordingly, embodiments of the present invention provide circuits, methods, and apparatus that perform a context switch quickly while not wasting a significant amount of in-progress work.

An exemplary embodiment of the present invention provides a cutoff point or stage in a texture pipeline. After receipt of a context switch instruction, texture requests and state updates that have progressed beyond the cutoff point are processed before the context switch is completed, while those above the cutoff point are not processed, but instead are stored in a memory. After the texture requests and state updates below the cutoff point are processed, global states in the texture pipeline can also be stored in the memory. This memory may be a frame buffer in a system or graphics memory, or it may be another memory. A second context may then be restored by loading its last global states into the texture pipeline, then reading its texture requests and state updates from the memory and providing them to the texture pipeline.

In particular, one specific embodiment of the present invention uses a first-in-first-out memory (FIFO), referred to here as a replay FIFO, or other local memory to store recent texture requests and state updates, that is, those requests and updates that have yet to reach the cutoff point in the texture pipeline. Another local memory stores a copy of the global states used the texture pipeline. When a context switch instruction is received, texture requests and state updates that have progressed beyond the cutoff point continue to be processed, while the contents of the FIFO are not processed, but stored in a second memory, such as a system or graphics memory. Once the texture requests and state updates below the cutoff point have been processed, the latest global states can be written from the local memory to the second memory. A second context can then be restored by reading the second context's global states, texture requests, and state updates. The global states should be restored the texture pipeline before processing begins in the texture pipeline. The global states can be loaded into the texture pipeline directly, or they may be rewritten to the global state memory, a second global state memory, or other appropriate circuit, before being loaded into the texture pipeline. The texture requests and state updates can then be provided to the texture pipeline. The texture requests and state updates can also be loaded into the texture pipeline directly, or they may be rewritten to the replay FIFO, a second FIFO, or other appropriate circuit. Processing of the second context can then continue.

The location of the cutoff point can be determined during design or dynamically during device operation. For example, the cutoff point may be a stage in the texture pipeline where it is known that once a texture request has reached that stage, it cannot result in a page fault. Alternately, other criteria may be used in determining the cutoff point. Various embodiments of the present invention may incorporate any of these or the other features described herein.

A better understanding of the nature and advantages of the present invention may be gained with reference to the following detailed description and the accompanying drawings.

DESCRIPTION OF EXEMPLARY EMBODIMENTS

Figure 1:
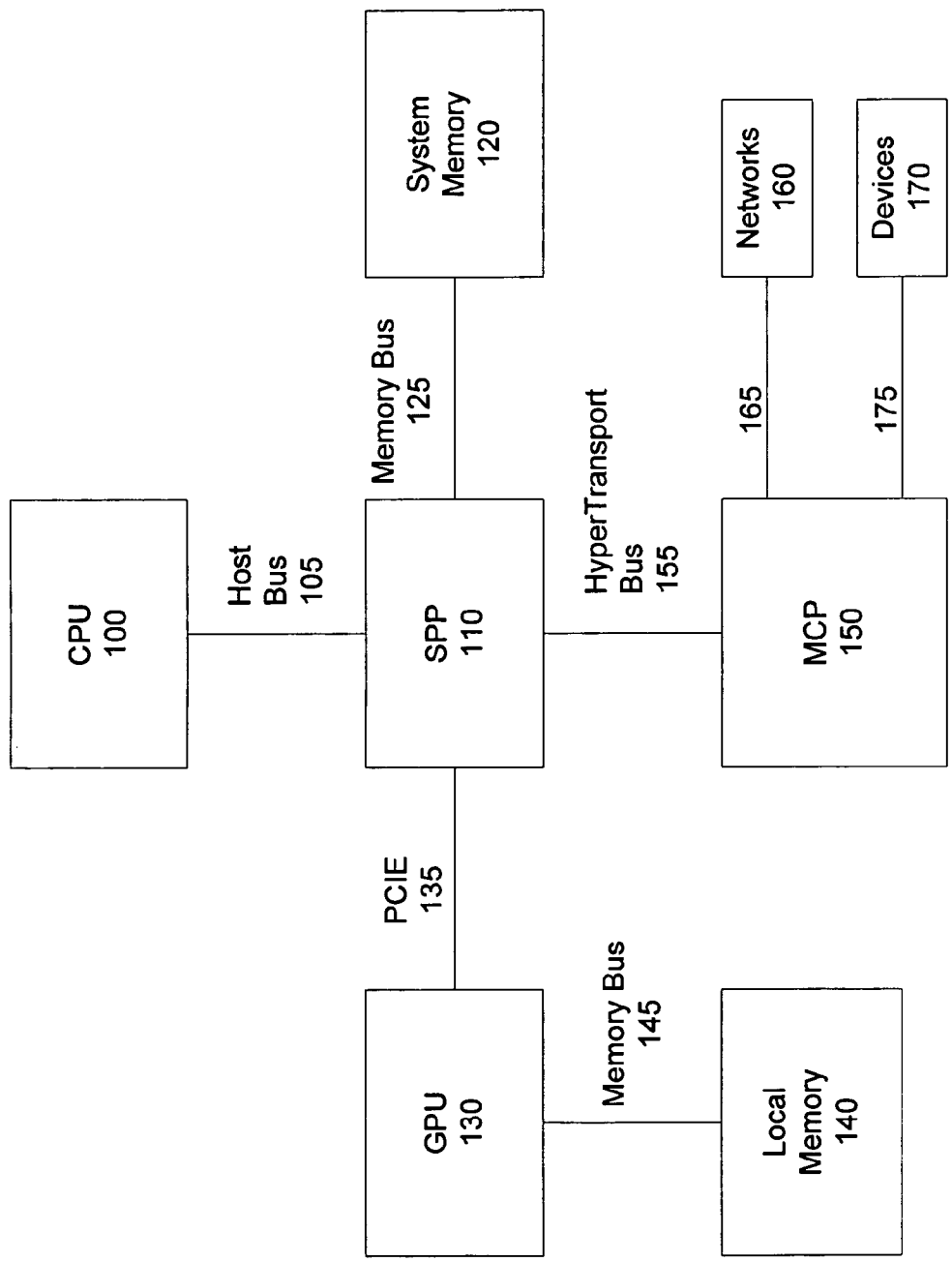
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, frame buffer, local, or graphics memory 140, MCP 150, networks 160, and internal and peripheral devices 170.

The CPU 100 connects to the SPP 110 over the host bus 105. The SPP 110 is in communication with the graphics processing unit 130 over an advanced graphics port (AGP) or peripheral component interconnect express (PCIE) bus 135. The SPP 110 reads and writes data to and from the system memory 120 over the memory bus 125. The MCP 150 communicates with the SPP 110 via a high-speed connection such as a HyperTransport bus 155, and connects network 160 and internal and peripheral devices 170 to the remainder of the computer system. The graphics processing unit 130 receives data over the AGP or PCIE bus 135 and generates graphic and video images for display over a monitor or other display device (not shown). The graphics processing unit 130 may make use of a frame buffer or graphics memory 140—via the memory bus 145—as well as the system memory 120.

The CPU 100 may be a processor, such as those manufactured by Intel Corporation, Advanced Micro Devices, or other supplier, and are well-known by those skilled in the art. The SPP 110 and MCP 150 are commonly referred to as a chipset. The memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

Embodiments of the present invention may be used to improve the graphics processing unit 130. Also, other systems are improved by the incorporation of embodiments of the present invention. For example, the GPU 130 and SPP 110 may be combined as an integrated graphics processor or IGP. This device is similarly improved by the incorporation of embodiments of the present invention. Moreover, other types of processors, such as video, audio, or general purpose processors, and other types of processors and circuits may be improved by the incorporation of embodiments of the present invention. Also, while embodiments of the present invention are well suited to texel storage, other types of data in graphics, video, audio, or other applications may be similarly improved. Further, other types of circuits will be developed, or are currently being developed, and these may also be improved by the incorporation of embodiments of the present invention.

Embodiments of the present invention save work that is in progress in a texture pipeline to the extent that it does not risk slowing the completion of a context switch unnecessarily. A texture pipeline receives pixels from a shader, generates texture requests, retrieves texels from a texture cache, and filters the retrieved texels. The filtered texels are then used to provide color for the pixels. For purposes of this document, some or all of these and other steps, or steps in a similar procedure, are referred to as stages in a texture pipeline, where the process is performed as texture requests proceed through the pipeline. For simplicity, texture requests are described as entering the top of the texture pipeline and progressing towards the bottom of the pipeline.

A texture pipeline stores and retrieves texel data using a texture cache. But not all texel data that may be needed can be stored in a texture cache, to do so is not currently cost effective since the texture cache would be prohibitively large. Thus, other levels of memory, such as a second level or L2 cache and a graphics or system memory, may be used to store texture data. Accordingly, when receiving a request for a texel, the cache first determines whether it is currently stored in the texture cache, or whether it needs to be retrieved from another memory. In an exemplary embodiment of the present invention, a first number of pipelines access a second number of L2 cache memories via a crossbar circuit. Each L2 cache memory can further access system or graphics memory via a frame buffer interface. An example is shown in the following figure.

Figure 2:
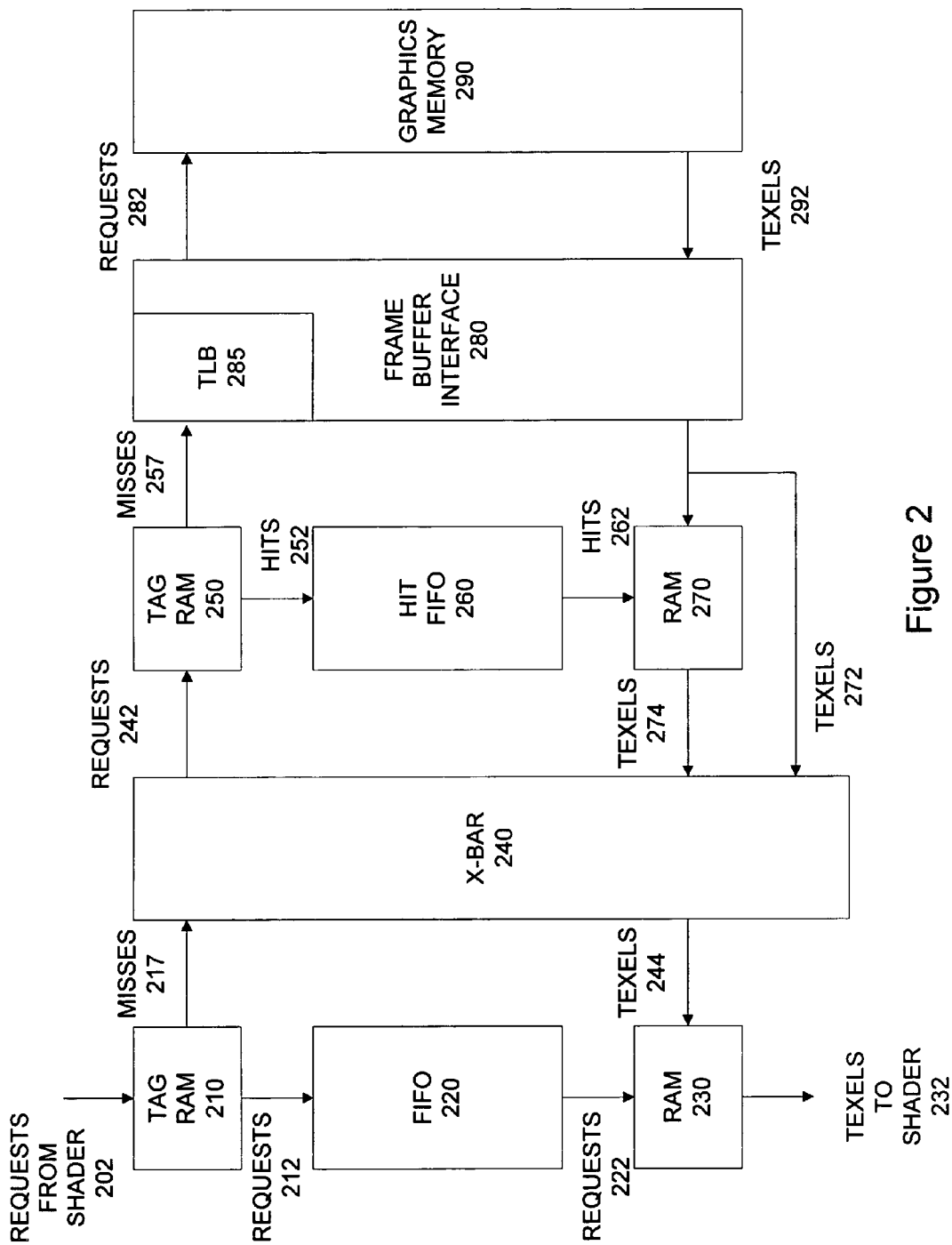
FIG. 2 is a block diagram of a texture pipeline communicating with an L2 cache in a partition via a crossbar according to an embodiment of the present invention.

FIG. 2 is a block diagram of a texture pipeline communicating with an L2 cache in a partition via a crossbar according to an embodiment of the present invention. This figure includes a texture data cache that includes a tag RAM 210, FIFO or other buffer 220, RAM 230, a crossbar 240, and a partition including a level two cache that includes tag RAM 250, hit FIFO 260, and RAM 270, as well as a frame buffer interface 280 that includes a translation lookaside buffer and communicates with a graphics memory 290. Typically, several texture caches communicate with several partitions via the crossbar 240, though only one texture cache and one partition are shown for simplicity.

Requests for texels are received from the shader on line 202 by the tag RAM 210. The tag RAM 210 determines whether the needed texels are stored in the texture cache or need to be retrieved from the partitions. If the needed texels are not stored in the texture cache, the tag RAM 210 provides the request on line 217 to the crossbar 240. The tag RAM 210 provides each request, hit or miss, on line 212 to the FIFO 220.

The FIFO 220 delays the requests, giving the partitions time to provide missing texels on line 244 to the RAM 230. As requests emerge from the FIFO 220 on line 222, the appropriate texels are read from the RAM 230 and provided to the shader on line 222.

Requests for missing texels are provided by the crossbar 240 to the appropriate partition on line 242. The tag RAM 250 receives the requests on line 242 and determines whether the needed texels are available in the L2 cache. If the texels are not available in the L2 cache, the tag RAM 250 requests the data from the frame buffer interface 280. The translation lookaside buffer translates virtual addresses used elsewhere to physical addresses used in the graphics memory 290. If the data is available in the second level cache, the tag RAM 250 provides the request to a hit FIFO 260 on line 252.

Frame buffer interface 280 provides requests on line 282 to the graphics memory or DRAM 290, which provides texels back to frame buffer interface 280 on line 292. The frame buffer interface provides these texels to the RAM 270 and directly to the crossbar 240 on line 272. In this way, the crossbar 240 does not need to wait for data to be read from the RAM 270. Requests that are hits emerge from the hit FIFO 260 on line 262, and corresponding texels are read from the RAM 270 and provided on line 274 to the crossbar 240. The crossbar 240 then provides the texels to the appropriate texture cache on line 244.

The circuit in this figure provides texture data or texels for use by the pipeline. Other types of data, such as texture states, can be cached for use by the texture pipelines. These caches may also have a second level cache which retrieves data from the memory 290 via the frame buffer interface 280. In one specific embodiment of the present invention, a texture state cache is distributed among the stages of the texture pipeline such that data is available as needed by the stages. An example of such a texture cache can be found in co-pending U.S. patent application Ser. No. 11/549,566, by Minkin, titled "Efficient Texture State Cache," filed Oct. 13, 2006, which is incorporated by reference.

Figure 3:
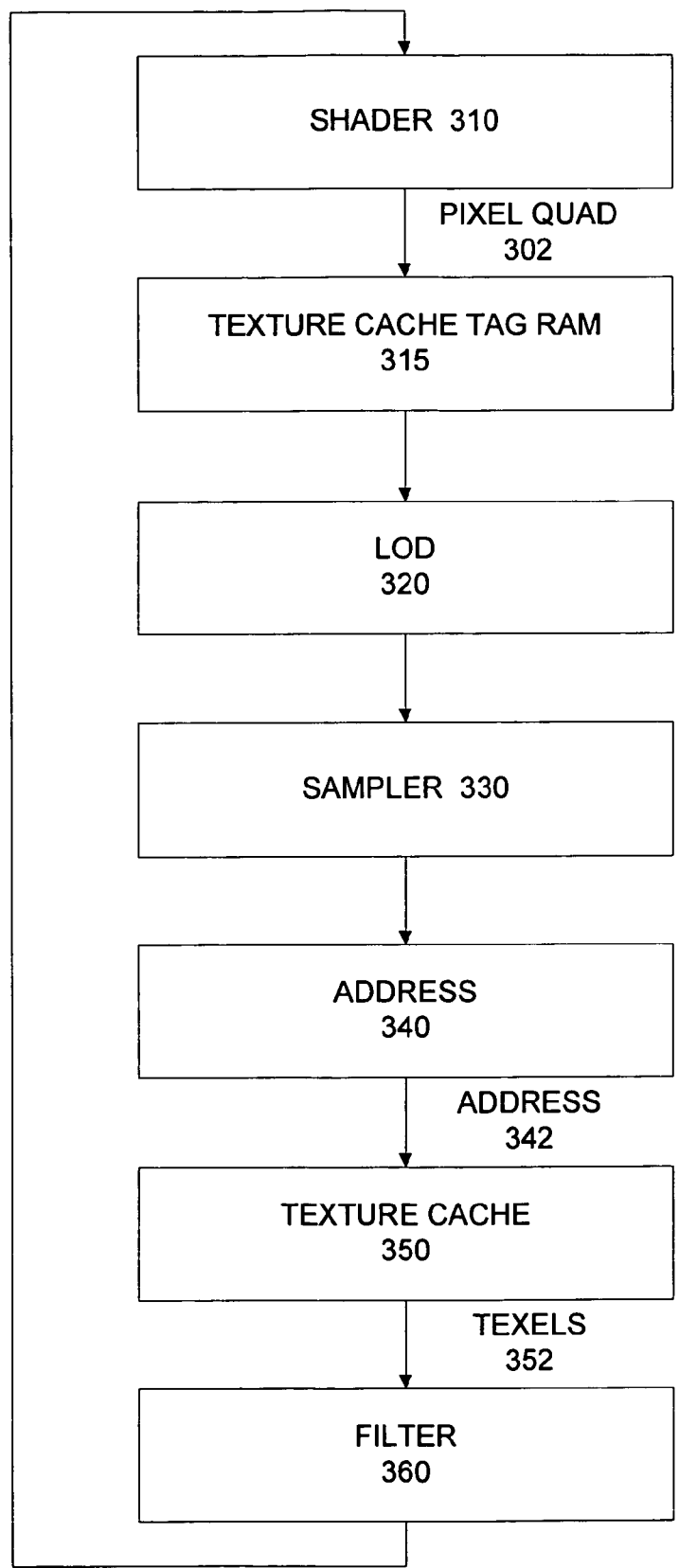
FIG. 3 is a block diagram of a texture pipeline according to an embodiment of the present invention.

FIG. 3 is a block diagram of a texture pipeline according to an embodiment of the present invention. This figure includes a shader 310, texture state tag RAM 315, level of detail circuit 320, sampler 330, address circuit 340, texture cache 350, and filter 360. Again, pixel quads are provided on line 302 by the shader 310. Typically, one pixel quad is provided each clock cycle. The pixel quads are received by the level of detail circuit 320, which determines the levels of detail needed. The tag RAM 315 determines whether the state for the requested texture data is stored in cache in the texture pipeline, or needs to be retrieved from a higher level memory. The tag RAM 315 provide outputs to the sampler, which in turn provides an output to the address block 340.

The address block 340 provides addresses on line 342 to the texture cache 350. Texels are provided on line 352 to the filter 360. The filter provides an output back to the shader 310.

Various embodiments of the present invention may make use of different texture pipelines. One such texture pipeline is a dual texture pipeline, that is, two texture pipelines that share a texture data cache. Such a texture cache can be found in co-pending U.S. patent application Ser. No. 11/960,645, by Minkin, titled "Reconfigurable Dual Texture Pipeline with Shared Texture Cache, filed Dec. 19, 2007, which is incorporated by reference. Also, various texture caches can be used, one such texture cache is shown in the following figure.

Figure 4:
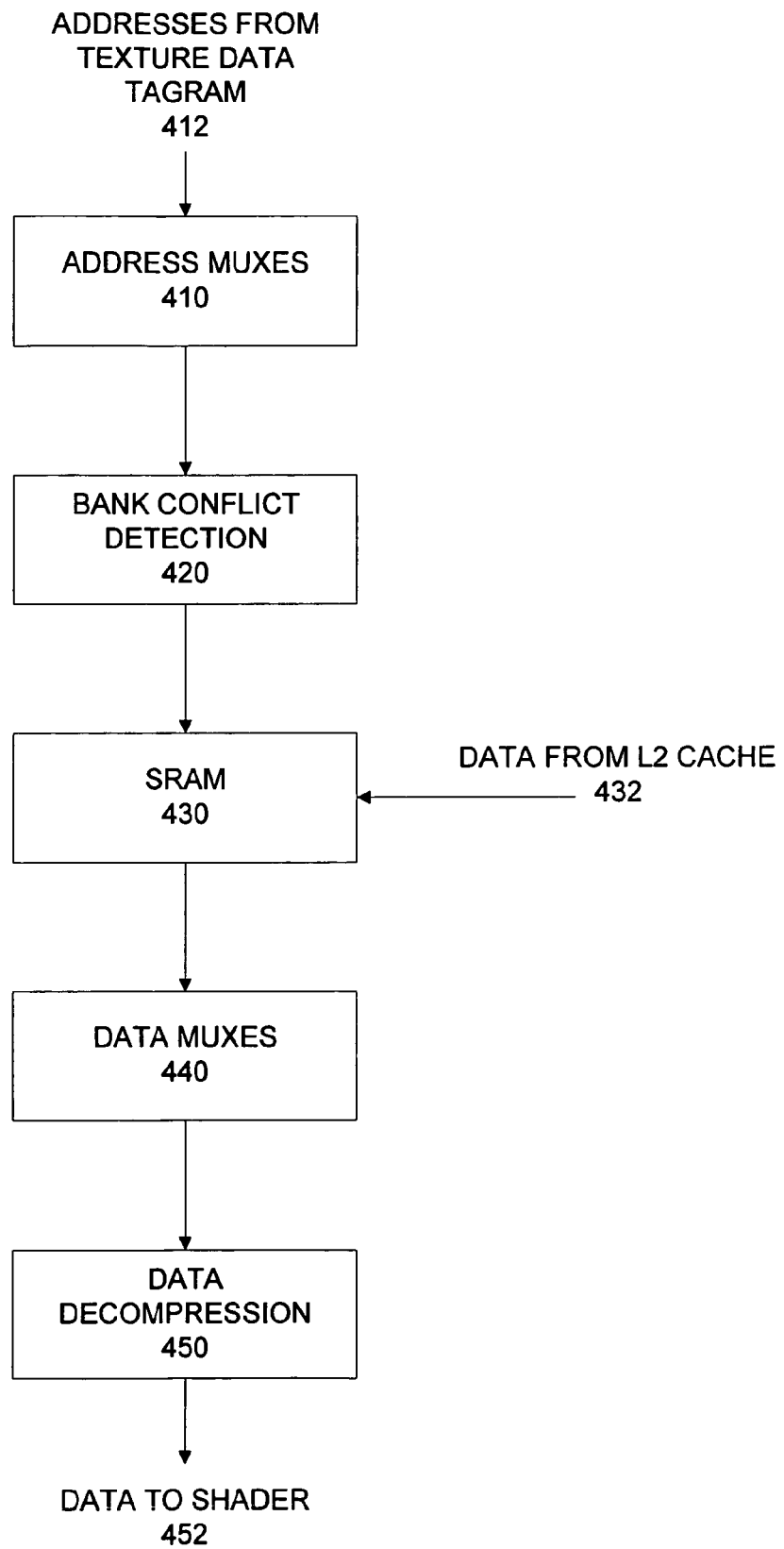
FIG. 4 is a block diagram of a texture cache and related circuitry according to an embodiment of the present invention.

FIG. 4 is a block diagram of a texture cache and related circuitry according to an embodiment of the present invention. This figure includes address multiplexers 410, bank conflict detection circuit 420, SRAM 430, data multiplexers 440, and data decompression circuit 450. Addresses are received from the tag RAM on line 412 by the address multiplexers 410. The address multiplexers multiplex addresses from the tag RAM to the individual banks that comprise the SRAM 430. These addresses are received by the bank conflict detection circuit of 420, which determines whether any conflicts arise, that is, whether two addresses are received for one bank.

If a conflict occurs, the conflicting addresses are serialized. This has a disadvantage that corresponding texels are retrieved in two clock cycles instead of one. Accordingly, texture caches provided by embodiments of the present invention are arranged in order to reduce the occurrence of bank conflicts.

Addresses are provided by the bank conflict detection circuit 420 to the SRAM 430. Texel data retrieved from the level 2 cache, which may in turn have come from the graphics memory, is received by the SRAM 430 on line 432. Texel data is retrieved from the SRAM 430 and multiplexed by the data multiplexers 440. The data multiplexers 440 sort data from the various banks of the SRAM 430 into a proper order for use by the texture filters.

Figure 5:
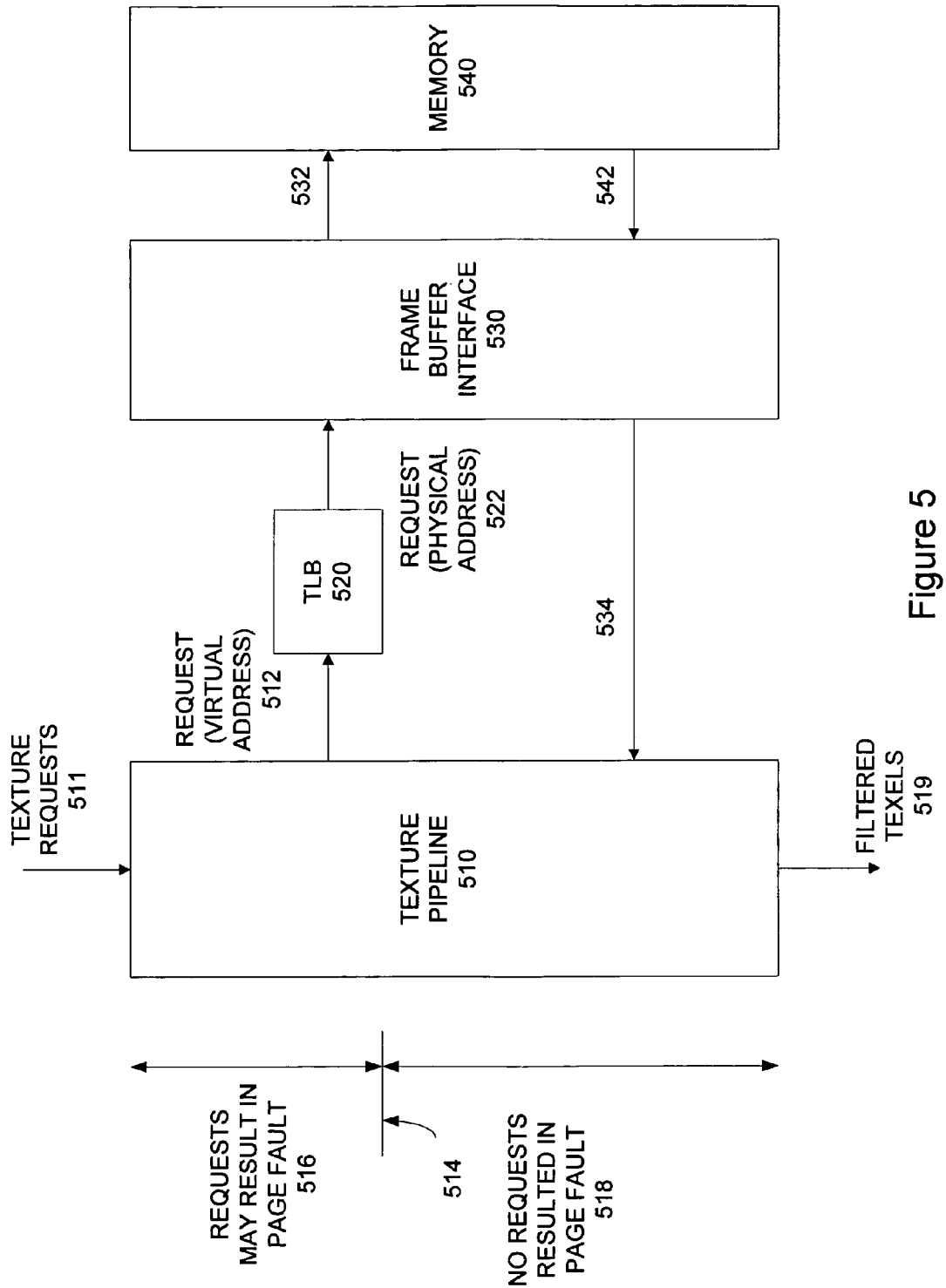
FIG. 5 is a block diagram of a texture pipeline and associated circuitry according to an embodiment of the present invention.

FIG. 5 is a simplified block diagram of a texture pipeline and associated circuitry according to an embodiment of the present invention. The complexities of L2 caches for texel data and texture sates and a crossbar are eliminated for simplicity, and embodiments of the present invention may or may not include these circuits. This figure includes a texture pipeline 510, translation lookaside buffer 520, frame buffer interface 530, and memory 540. In this figure, the translation lookaside buffer 520 is shown separately from the frame buffer interface 530 for clarity. This figure, as with the other included figures, is shown for exemplary purposes and does not limit either the possible embodiments of the present invention or the claims.

The texture pipeline 510 receives texture requests on line 511 from a shader (not shown). If the texture cache in the texture pipeline 510 does not have a requested texel or required texture state, the texture pipeline 510 requests the data by providing a request on line 512 to the translation lookaside buffer 520. This request uses a virtual address for the location where the data is stored in memory. The translation lookaside buffer 520 translates the virtual address to a physical address and provides a request on line 522 to the frame buffer interface 530. The frame buffer interface provides the request on line 532 to the memory 540. The needed data is retrieved from the memory 540 and provided on line 542 to the frame buffer interface 530. The frame buffer interface 530 then writes the data on line 534 to the texture data or state cache in the texture pipeline 510, either directly or indirectly via a crossbar as shown above or via another intermediary circuit.

This figure also shows a graphical representation of the progress texture requests in the texture pipeline 510. Specifically, texture requests and state updates are received on line 511 by the texture pipeline 510 from a shader, and outputs are provided on line 519 back to the shader. Between these events, texture requests progress through the texture pipeline. Again, for explanatory purposes, this is shown as a progression from the top to the bottom of the texture pipeline 510. A cutoff point 514 is also shown. As described above, the cutoff point is a step or stage in the texture pipeline 510. Texture requests that have not reached the cutoff point in the pipeline are shown as requests and state updates 516, while those that have progressed beyond the cutoff point are shown as texture requests and state updates 518.

In various embodiments of the present invention, the cutoff point 514 may be determined by one or more various factors. In a specific embodiment of the present invention, the cutoff point is determined as the point where it is known that a texture request received on line 511 does not result in a page fault at the memory 540. That is, the texture pipeline can be analyzed and a stage in the pipeline found, below which it can be determined that a texture request has progressed far enough that it will not cause a page fault in memory. This stage can be used as the cutoff point 514, since a request that does not result in a page fault can be processed without unduly slowing a context switch, while a request that does cause a page fault would slow the context switch and thus should be held in abeyance until a later time. The dynamics of how a texel request can delay a context switch by causing a page fault are discussed in the following paragraphs.

Again, if a needed texel is not stored in the texture pipeline cache, it is requested from a higher level memory such as a second level or L2 cache, a system or graphics memory, or a mass storage device such as a hard disk drive. Once retrieved, the data is stored in the texture cache and retrieved as needed. The amount of time needed for the texel to be requested and then written to the texture cache is determined to a large extent by the location of the needed texel. For example, if the texel is stored in the second level cache, the time from the texel miss request from the texture pipeline 510 to when the texture cache is updated can be very short, particularly if out-of-order texture requests are provided by the L2 cache. An example of such a circuit can be found in copending U.S. patent application Ser. No. 11/313,587, titled "Out of Order L2 Cache," by Donham et al., filed Dec. 20, 2005, which is incorporated by reference. However, if the texel needs to be retrieved from the system or graphics memory, the round trip takes more time, while if it must be retrieved from disk, the round trip is considerably longer.

Applications, such as graphics programs, running on computer systems store data in pages in virtual memory. Some of this virtual memory is stored in physical memory, that is, a system or graphics memory. The excess virtual memory is typically stored on a hard disk drive or other mass storage device. If a needed texel is stored in virtual memory that is currently stored on disk, it can take a very long time to retrieve. When data that is not stored in physical memory is needed, a page fault is said to have occurred. At that point a page in physical memory that has not been recently used can be swapped with the page on the disk that holds the required data. Since this swap takes a long time to perform, the point where it is know that a request will not result in a page fault is used as the cutoff point in an embodiment of the present invention.

As texture requests received on line 511 progress through the texture pipeline 510, a point is reached where it is known that the request does not result in a page fault. Accordingly, texture requests below this point can continue to be processed a following context switch, since these requests will not result in an excessive delay caused by a page fault while the needed texels are retrieved from memory. On the other hand, texture requests received on line 511 that have not reached this point may result in a long delay caused by a page fault. Thus, following a context switch, a specific embodiment of the present invention continues to process texture requests that have progressed through the texture pipeline 510 beyond the cutoff point 514, while texture requests 516 that have not reached to cutoff point 514 are not processed.

In other embodiments of the present invention, other criteria may be used in setting the cutoff point 514. For example, the cutoff point 514 may be located where it is known that a texture is not stored in either the texture cache or second level or L2 cache, but rather needs to be retrieved from a system or graphics memory. Alternately, the stage in the pipeline where it is determined that the needed texel is not stored in the texture cache may be used for the cutoff point 514.

The location of the cutoff point 514 can alternately be determined dynamically. For example, requests in a texture pipeline 510 or texture pipeline portion can be analyzed as to whether they may result in a page fault. Information as to whether texture request may or will cause a page fault can be found in various embodiments of the present invention in the translation lookaside buffer 520, frame buffer interface 530, or other involved circuitry.

The requests 518 below cutoff point 514 continue to be processed by the texture pipeline 510 following receipt of a context switch instruction. The more recent requests 516 can be stored in a FIFO, which can be referred to as a replay FIFO, or other type of memory. In this way, a current context state can be restored by replaying the contents of the replay FIFO.

To restore the current state of a texture pipeline requires more than rerunning the recent texture requests, however. Specifically, a number of global states exist in the texture pipeline. These states should also be restored to the texture pipeline. Accordingly, these global states can be stored in a global state SRAM or other type of memory. An embodiment of the present invention that includes a replay FIFO for storing texture requests and state updates and an SRAM for storing global states is shown in the following figure.

Figure 6:
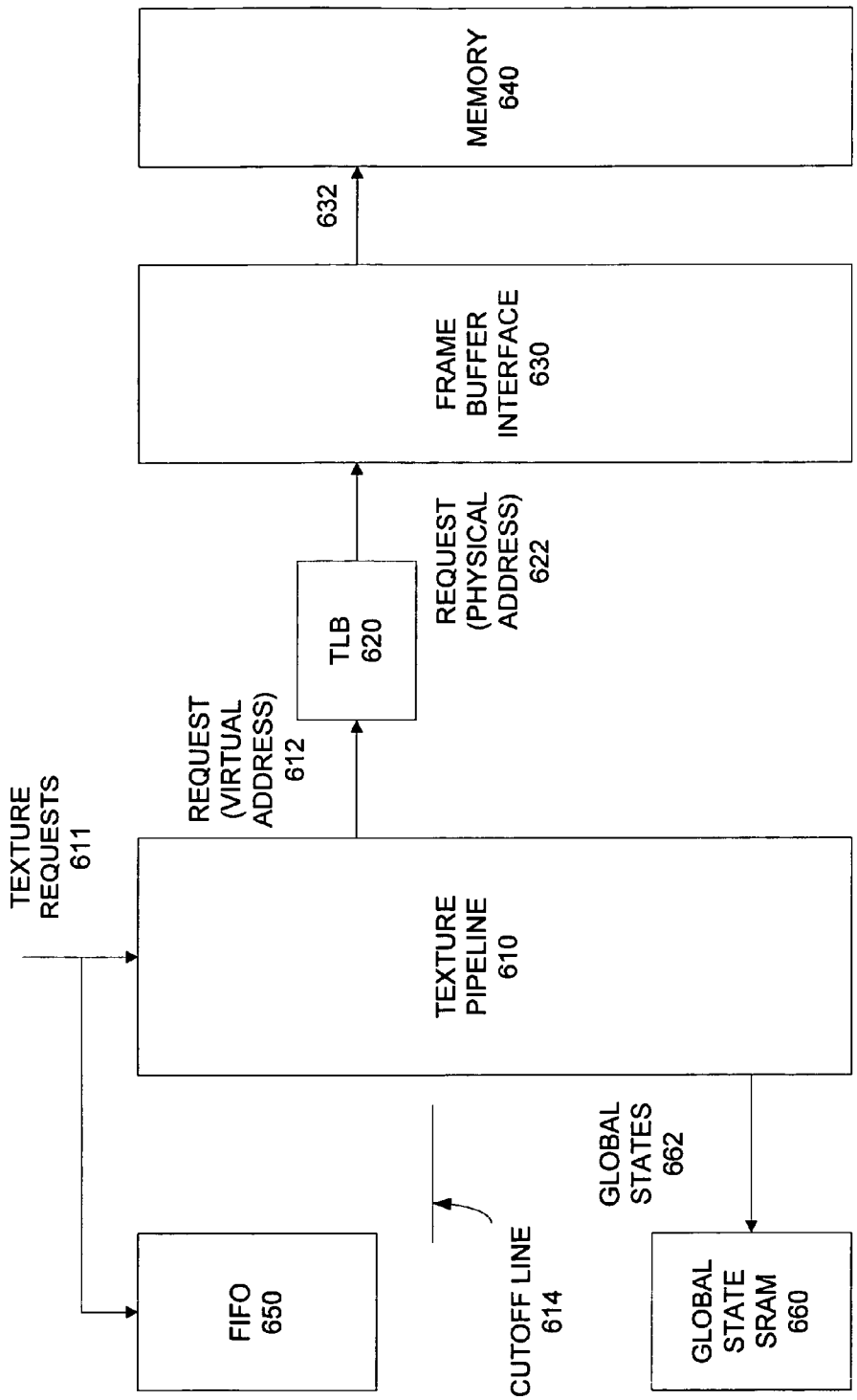
FIG. 6 is a block diagram of a texture pipeline and related circuitry for storing and recovering context information during a context switch according to an embodiment of the present invention.

FIG. 6 is a block diagram of a texture cache and related circuitry for storing and recovering context information during a context switch according to an embodiment of the present invention. This figure includes a texture pipeline 610, translation lookaside buffer 620, frame buffer interface 630, memory 640, replay FIFO 650, and global state SRAM 660. Texture requests and other state update information are received on line 611 by the texture pipeline 610 and FIFO 650. The FIFO 650 stores a number of recent texture requests and state updates. In the absence of a context switch, new texture requests received by the FIFO 650 displace the oldest texture requests and state updates in the FIFO 650. The older requests and state updates do not need to be stored since in the event of a context switch, the corresponding requests and updates in the texture pipeline 610 are processed before the context switch is completed.

As the global states of the texture pipeline 610 are updated, they are written to the global state SRAM 660. In this way, the global state SRAM 660 maintains a snapshot of the latest global states in the texture pipeline 610, which can be used when a current context is restored.

Again, the location of the cutoff point is determined by analyzing the design. As discussed above, at some stage in the pipeline, it can be said that a texture request at that stage has progressed far enough that it will not cause a page fault in memory. This stage can be used as the cutoff point 614. Once the location in the pipeline of an appropriate cutoff point 614 is determined during the design process, the depth of the FIFO 650 can be set. The depth of the FIFO 650 can set deep enough to store the texture requests and state updates in the pipeline above the cutoff point 614. In this way, during normal operation, texture requests that are in the pipeline above the cutoff point 614 have a corresponding entry in the FIFO 650. Texture requests at or below the cutoff point have had their corresponding entry in the FIFO 650 dropped or overwritten by new texture requests and state updates.

In various embodiments, these or other methods of setting the cutoff point 614 and determining the corresponding depth of the replay FIFO may be used. Again, the overarching concern is to not delay a context switch unnecessarily, for example by processing a page fault, while not wasting processor bandwidth by making the texture pipeline reload more texture requests and state updates than necessary following a context switch.

Specifically, the processing done on texture requests and state updates that are above the cutoff point 614 when a context switch instruction is received is lost. The texture requests and state updates are stored in memory and later reloaded into the texture pipeline, which then begins reprocessing them a second time. Thus, it is desirable to locate the cutoff point early in the texture pipeline 610. However, if the cutoff point is too early, and a texture request causes a page fault, the context switch is slowed unnecessarily, thus a later cutoff point is desirable for this reason. Accordingly, one or more of these or other techniques and methods may be used to balance these concerns appropriately in setting the cutoff point 614.

Again, following a context switch, the contents of the replay FIFO 650 and global state SRAM 660 can be written to the memory 640. In this way, a number of contexts can be stored in the memory 640 and restored as needed. Several programs or applications, each with their own context, may be running at any given time. Storing requests, state updates, and global states for each of these contexts locally could become very expensive in terms of circuit complexity and die area. Accordingly, in an exemplary embodiment of the present invention, this data is stored in an external memory such as a system or graphics memory. The data flow involved in saving a context is shown in the following two figures.

Figure 7A:
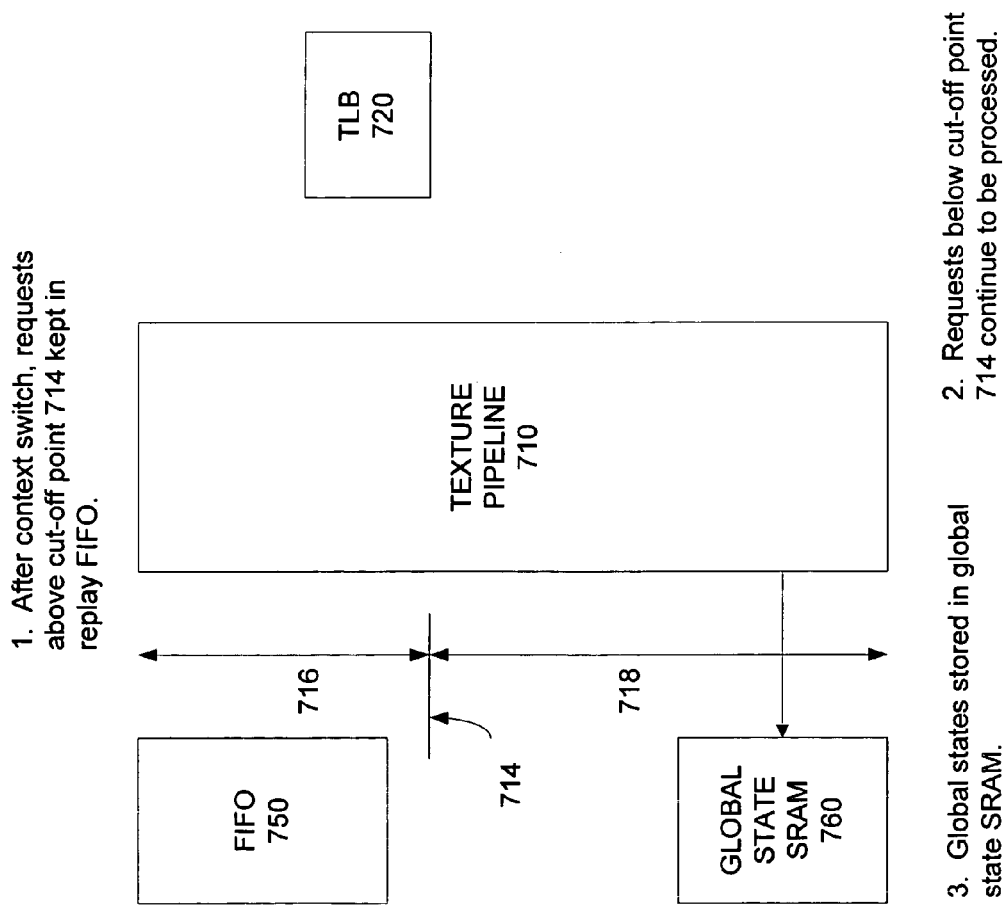
FIGS. 7A and 7B illustrate the data flow involved in saving a context according to an embodiment of the present invention.
Figure 7B:
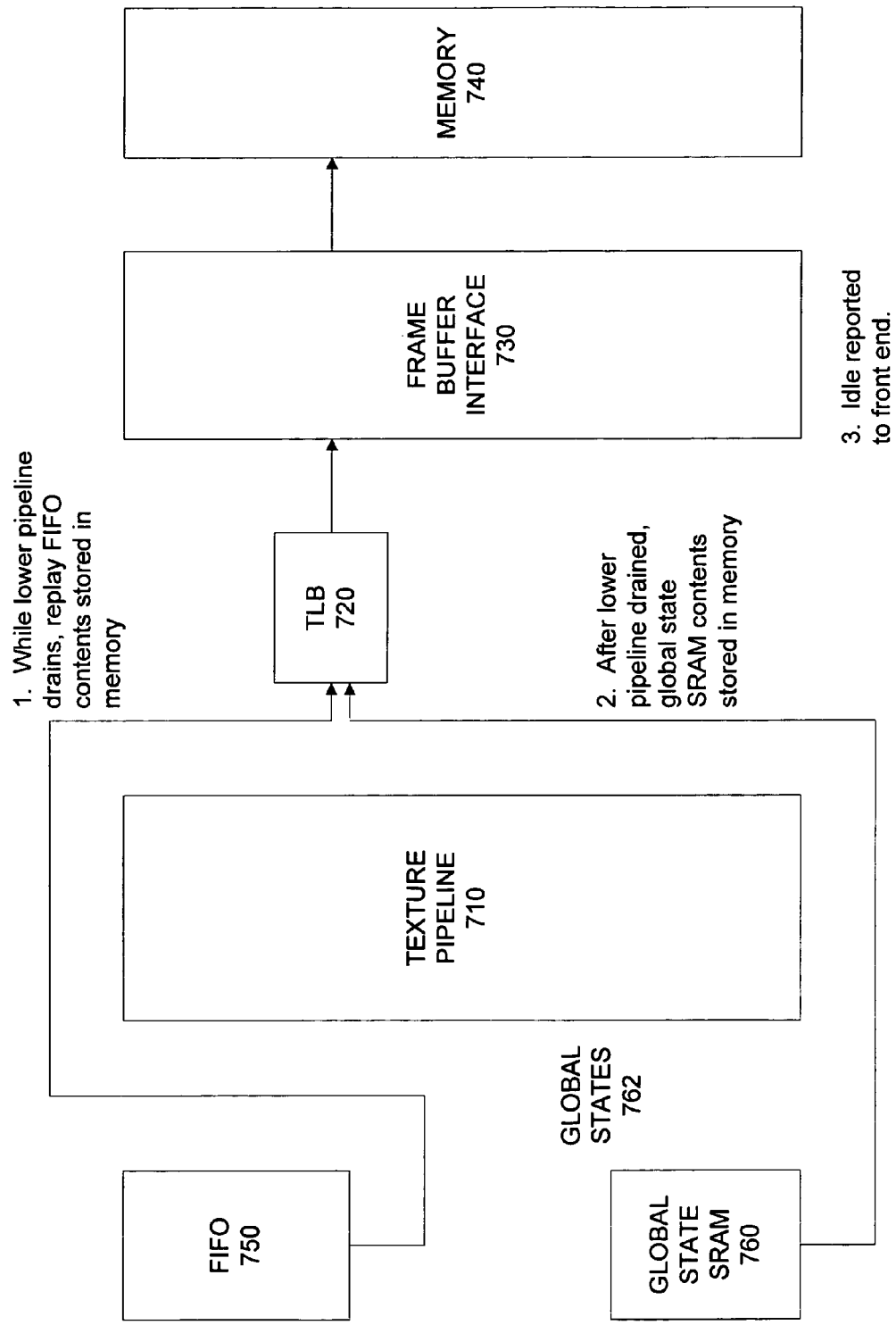

FIGS. 7A and 7B illustrate the data flow involved in saving a context according to an embodiment of the present invention. These figures include a texture pipeline 710, translation lookaside buffer 720, frame buffer interface 730, memory 740, replay FIFO 750, and global state SRAM 760.

In FIG. 7A, a cutoff point 714 is graphically represented as being in the texture pipeline 710. Again, this cutoff point 714 represents a stage, or step, in the processing performed by the texture pipeline 710. Texture requests and state updates above that point are stored in the FIFO 750. A global state SRAM 760 stores the current state of the texture pipeline 710.

After receiving an instruction to switch contexts, the FIFO 750 maintains its contents, while texture requests and state updates 718 below the cutoff point 714 continue to be processed by the texture pipeline 710. Any global state updates that occur during the processing of the texture requests and state updates 718 can be stored to the global state SRAM 760, such that the global state SRAM contains the latest state information.

In FIG. 7B, while the lower pipeline drains, the contents of the FIFO 750 can be written to the memory 740. Similarly, the contents of the global state SRAM 760 can be stored in the memory 740 after the lower pipeline is drained. In a specific embodiment, the contents of the global state SRAM 760 are written to memory after the texture requests and state updates 718 have been processed, such that the last global states are available for use when this context is later restored.

Specifically, the FIFO 750 and global state SRAM 760 provide memory write requests to the translation lookaside buffer 720. The translation lookaside buffer provides write requests using physical addresses to the frame buffer interface 730. The frame buffer interface 730 then writes this data in the memory 740. While the lower pipeline is being drained, data from the replay FIFO can be transferred to memory. When the texture pipeline 710 has completed processing the texture requests and state updates below the cutoff point, the final global states can be written to memory. Following this, a signal indicating that the pipeline is now idle can be reported to the front end or other appropriate circuit. When the front end or other appropriate circuit has received an idle signal from each texture pipeline in the graphics processor, a context switch can be done.

At some point during the transition from one context to another, the caches in the texture pipeline should be invalidated to prevent incorrect data from being provided to the pipeline. Similarly, higher level caches, such as second-level texture data and state caches, should be invalidated.

Embodiments of the present invention store may store various types of data in different caches in a texture pipeline. For example, texture data or texels are typically cached. Also, texture states, which provide information regarding texture properties and the way they are to be processed, are typically cached as well. Typically, these are cached in the texture pipeline and in at least one other higher or second-level cache. In other embodiments of the present invention, other data may be cached in the pipeline and higher level caches. During a context switch, these caches can be invalidated. The caches can be updated with new data after the context switch using cache-miss mechanisms, such as those described above. That is, the caches can be updated by having cache-miss requests from the texture pipeline caches being serviced by higher levels of cache and memory.

In other embodiments, the caches can be updated in different ways following a context switch, without relying on cache-misses being serviced. For example, when storing a context, data from one or more caches in the texture pipeline can be stored in the memory, much in the same way the contents of the replay FIFO and global state SRAM are stored. When a context is restored, the cache data for the new context can be read from memory and cached in the texture pipeline, overwriting cache data for the context being replaced.

Thus, an embodiment of the present invention saves a context by transferring texture requests and state updates from the replay FIFO to memory and draining the requests and state updates below a cutoff line. Once these are drained, the global state SRAM contents can be transferred to memory. The various caches can either be invalidated or copied to memory. A flowchart of such a method of saving a context is shown in the following figure.

Figure 8:
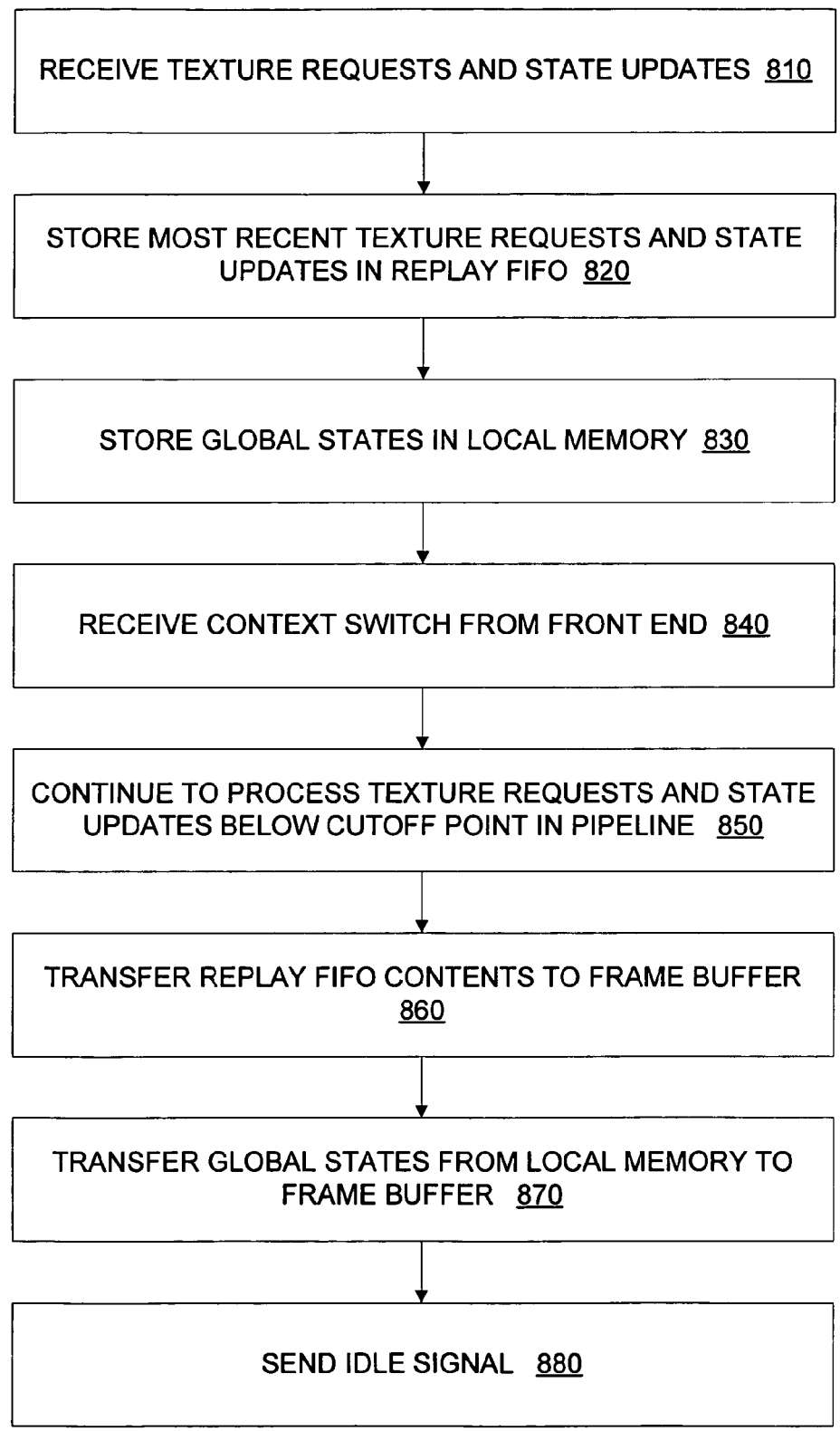
FIG. 8 is a flowchart illustrating a method of saving a context for later use according to an embodiment of the present invention.

FIG. 8 is a flowchart illustrating a method of saving a context for later use according to an embodiment of the present invention. In this figure, texture requests and state updates are stored, first in a local replay FIFO or other holding memory, and later in a system or graphics memory. Similarly, global states are initially stored in a local memory, then stored in a system or graphics memory.

Specifically, in act 810 texel requests and state updates are received by a texture pipeline. The more recent texture requests and state updates are stored in a replay FIFO or other memory in act 820. Global states are stored in a local memory in act 830.

In act 840, a context switch command is received from a front end or other appropriate circuit. After this time, texture requests and state updates that are below a cutoff point continue to be processed in act 850. In act 860, the replay FIFO contents are stored in a memory, for example a frame buffer located in a system or graphics memory. The global state SRAM contents are written to the same or other memory in act 870. In a specific embodiment of the present invention, the global state memory contents are stored in a frame buffer after the last texture requests and state updates below the cutoff point have been processed in act 850. In this way, when this particular context is later restored, the texture pipeline reflects the last global state for that context. An idle signal can be sent, and the texture data and state caches can be invalidated.

After a first context has been saved, a second context is restored such that the texture pipeline can resume working on the second context. An exemplary data flow that occurs during the restoration of a context is shown in the next two figures.

Figure 9A:
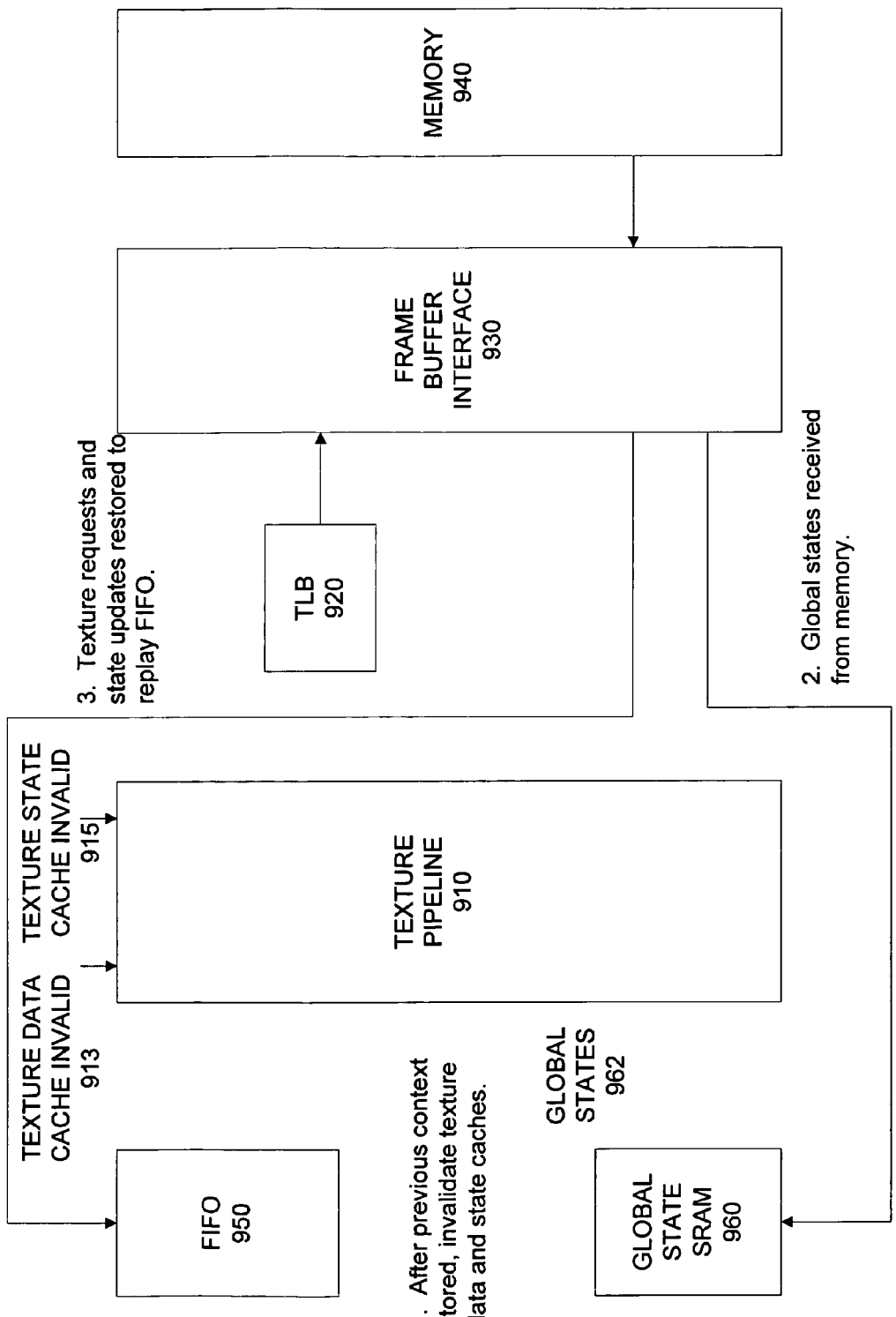
FIGS. 9A and 9B illustrate the flow of data during the restoration of a context following a context switch according to an embodiment of the present invention.
Figure 9B:
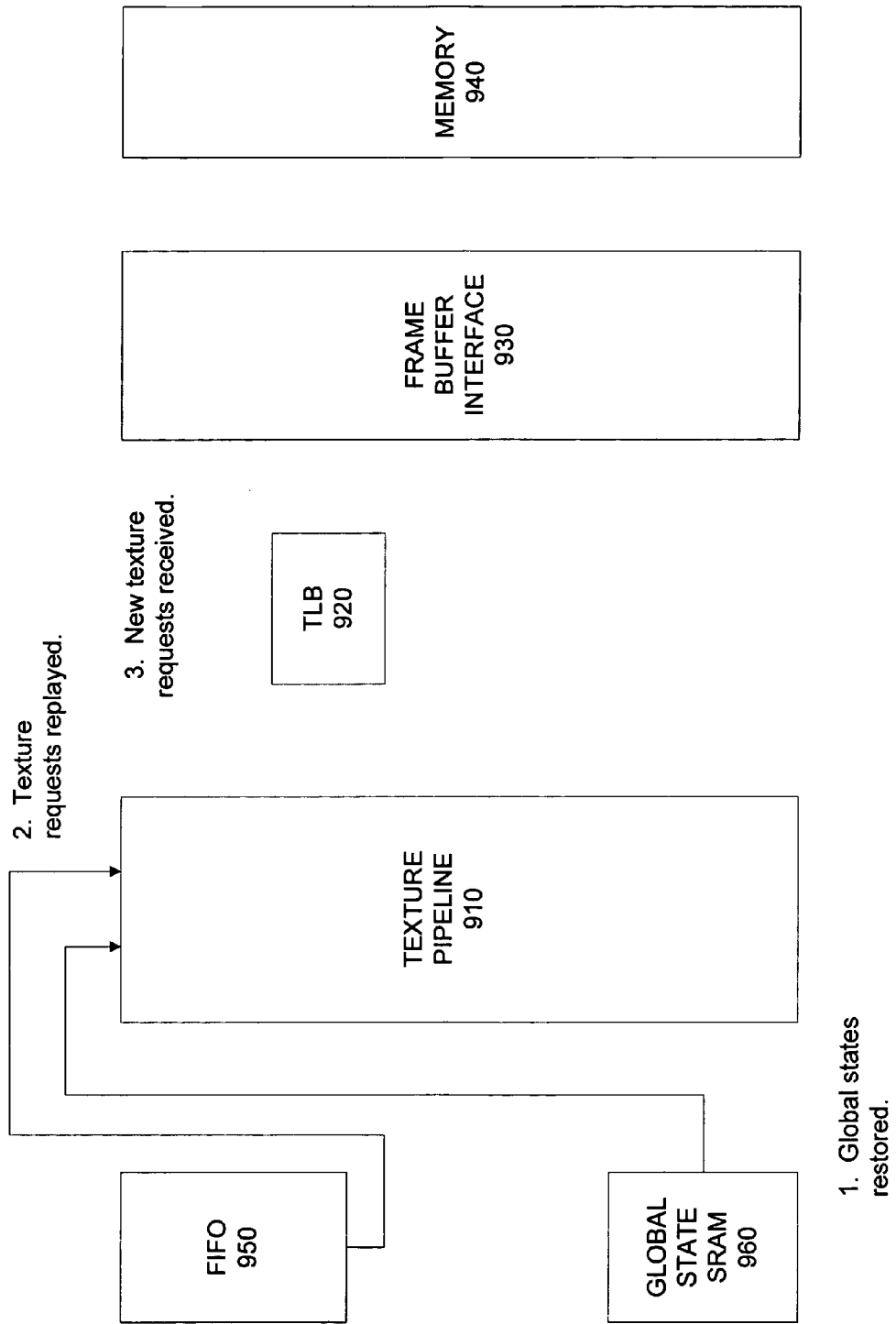

FIGS. 9A and 9B illustrate the flow of data during the restoration of a context following a context switch according to an embodiment of the present invention. These figures include a texture pipeline 910, translation lookaside buffer 920, frame buffer interface 930, memory 940, FIFO 950, and global state SRAM 960.

In FIG. 9A, after a previous context has been stored, the current texture state in the texture pipeline 910 is invalidated. The previously stored global states are received from memory 940 and stored in the global state SRAM 960. Similarly, texture requests and state updates are restored to the replay FIFO 950.

In FIG. 9B the global states are restored to the texture pipeline 910 from the global state SRAM 960. Once the global states are restored, the texture requests and state updates are replayed from the FIFO 950 to the texture pipeline 910. Following this, new texture requests and state updates may be received by the texture pipeline 910 from the shader.

In these figures, data is first restored to the FIFO 950 and global state SRAM 960, before being provided to the texture pipeline 910. In other embodiments of the present invention, the global states and textures may be provided by other paths. For example, the frame buffer interface may upload this information directly into the texture pipeline 910, or this information may be stored in other intermediary circuits before being uploaded into the texture pipeline 910. For example, two FIFOs may be used for a context switch, one to store data from a current context before being sent to a system or graphics memory, and one to store data for a next context received from the system or graphics memory. Similarly, two global state SRAMs may be used.

After all texture pipelines in the processor have reported idle and the texture pipeline caches have been invalidated, a second context can be processed. First, however, the second context is restored. A flowchart illustrating a method of restoring a context is shown in the following figure.

Figure 10:
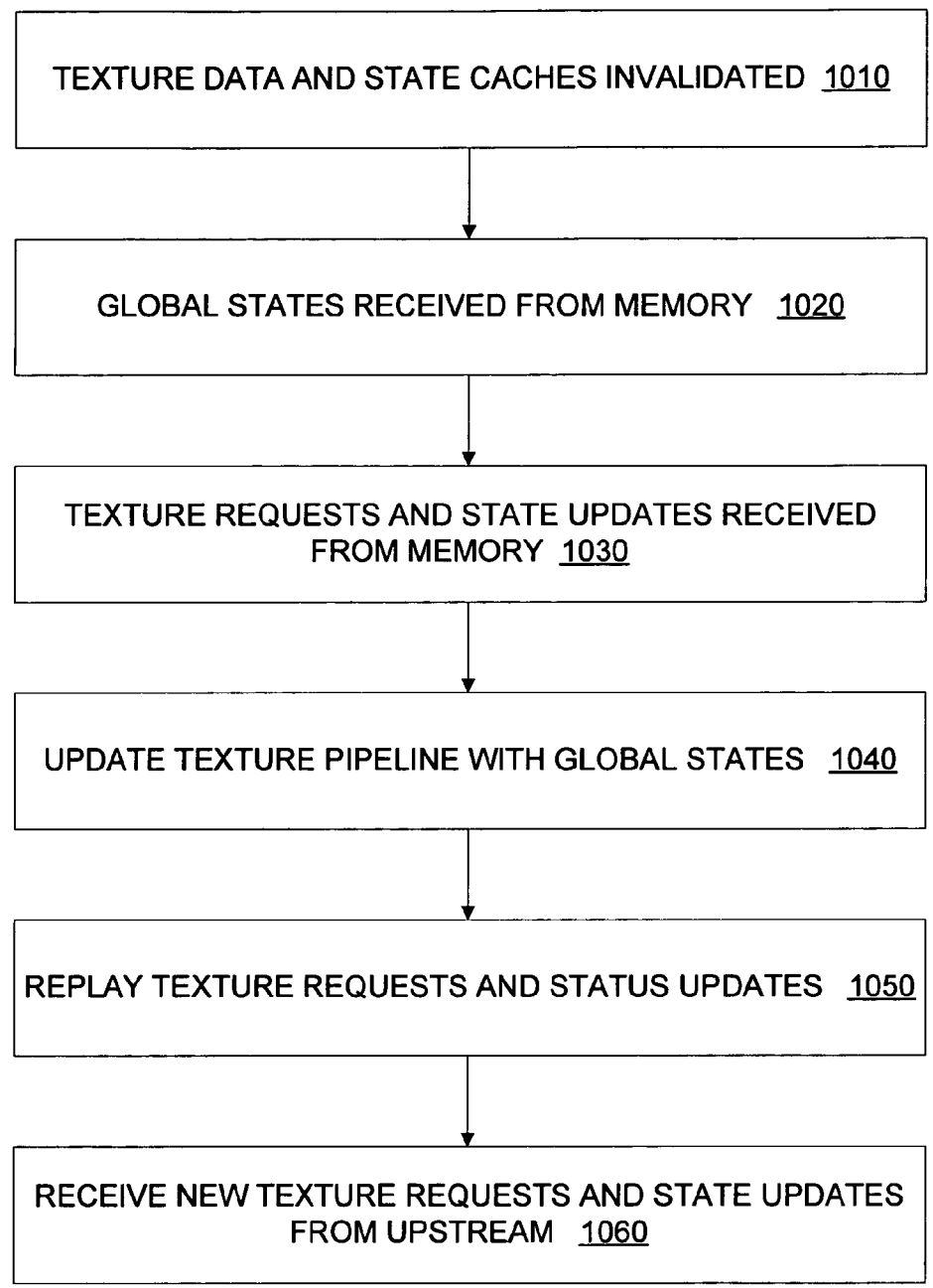
FIG. 10 is a flowchart illustrating a method of restoring a context according to an embodiment of the present invention.

FIG. 10 is a flowchart illustrating a method of restoring a context according to an embodiment of the present invention. In this method, the contents of the texture data and state caches are invalidated. Texture requests, state updates, and global states are received from a memory, and a texture pipeline is updated with the global states for the new context. Following this, processing of the new context can continue.

Specifically, in act 1010, current entries in the texture data and state caches are invalidated. Global states are received from a memory in act 1020. Again, this memory is typically a large external memory, such as a system or graphics memory. In other embodiments of the present invention, a sufficiently large on-chip memory may be used to store this information. In a specific embodiment of the present invention, these global states are received by an SRAM, though other intermediary circuits or no intermediary circuits may be used.

Texture requests and state updates are received from a memory in act 1030. This memory may be the same memory that provides the global states in act 1020, or it may be another memory. Again, this memory is typically external, though in other embodiments it may be on the same integrated circuit as the texture pipeline. The texture requests and state updates may be received and stored in a replay FIFO or other intermediary circuit.

In act 1040, the texture pipeline is updated with the last global states, which were stored during a previous context switch. The texture requests and status updates are replayed in act 1050. In act 1060, new texture requests and state updates can be received, and the current context can continue to be processed.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of switching from a first context to a second context comprising:

receiving a first plurality of texture requests and storing the first plurality of texture requests in a texture pipeline; then receiving a second plurality of texture requests and storing the second plurality texture request in the texture pipeline such that the first plurality of texture requests are stored in the texture pipeline below a cutoff point and the second plurality of texture requests are stored in the texture pipeline above the cutoff point; and storing the second plurality of texture requests in a first memory; then receiving an instruction to switch from a first context to a second context; then processing the first plurality of texture requests, wherein the cutoff point is set such that processing texture requests in the texture pipeline below the cutoff point cannot cause a page fault in memory.

2. The method of claim 1 wherein the processing the first plurality of texture requests cannot result in a page fault.

3. The method of claim 2 further comprising:
storing a first plurality of global states in a second memory.

4. The method of claim 3 further comprising:
transferring the second plurality of texture requests to a third memory; and
transferring the first plurality of global states to the third memory.

5. The method of claim 4 wherein first and second memories are located on a first integrated circuit, and the third memory is not located on the first integrated circuit.

6. The method of claim 4 further comprising:
receiving a third plurality of texture requests from the third memory; and
receiving a second plurality of global states from the third memory.

7. The method of claim 6 further comprising:
storing the third plurality of texture requests in the first memory; and
storing the second plurality of global states in the second memory.

8. The method of claim 6 further comprising:
processing the third plurality of texture requests.

9. The method of claim 8 wherein the first memory is a FIFO memory, the second memory is an SRAM, and the third memory is a DRAM.

10. An integrated circuit comprising:
a texture pipeline including a texture cache, the texture pipeline configured to receive, store, and process texture requests, the texture pipeline having a cutoff point, wherein more recently received texture requests are stored above the cutoff point and the cutoff point is set such that processing texture requests in the texture pipeline below the cutoff point cannot cause a page fault in memory;

a first-in-first-out memory configured to receive and store texture requests, wherein the first-in-first out memory stores texture requests corresponding to texture requests in the texture pipeline above the cutoff point; and a frame buffer interface configured to receive texture requests from the texture pipeline, to read texel data from a second memory, and provide the texel data to the texture cache, wherein the frame buffer interface is further configured receive texture requests from the first-in-first-out memory and store the received texture requests in the second memory following an instruction to switch from a first context to a second context.

11. The integrated circuit of claim 10 further comprising a third memory coupled to the texture pipeline and configured to store global states present in the texture pipeline.

12. The integrated circuit of claim 11 wherein requests for texels are received by the frame buffer interface via a second level cache.

13. The integrated circuit of claim 11 wherein requests for texels are received by the frame buffer interface via a crossbar circuit and a second level cache.

14. The integrated circuit of claim 11 wherein the integrated circuit is a graphics processor.

15. An integrated circuit comprising:
- a shader;
- a texture pipeline having an input coupled to an output of the shader, the texture pipeline storing a first plurality of texture requests above a cutoff point and a second plurality of texture requests below the cutoff point, the first plurality of texture requests received after the second plurality of texture requests, the cutoff point set such that processing the second plurality of texture requests cannot result in a page fault in memory;
- a first memory having an input coupled to the output of the shader and storing a plurality of texture requests corresponding to the first plurality of texture requests; and
- a frame buffer interface coupled to the texture pipeline and the first memory,
- wherein the frame buffer interface is configured to transfer a first plurality of texture requests from the first memory to a second memory after a signal to switch contexts is received.

16. The integrated circuit of claim 15 further comprising:
- a third memory configured to receive and store global states from the texture pipeline after the signal to switch contexts is received.

17. The integrated circuit of claim 16 wherein the frame buffer interface is further configured to transfer a plurality of global states from the third memory to the second memory after the signal to switch contexts is received.

18. The integrated circuit of claim 15 wherein the shader is further configured to provide state updates to the texture pipeline and the first memory.

19. The integrated circuit of claim 18 wherein the first memory is a first-in-first-out memory.

20. The integrated circuit of claim 15 wherein the integrated circuit is a graphics processor.

\* \* \* \* \*